(12) United States Patent
Wilber

(10) Patent No.: US 6,614,193 B2
(45) Date of Patent: Sep. 2, 2003

(54) DEFLECTION CURRENT MODULATION CIRCUIT

(75) Inventor: James Albert Wilber, Indianapolis, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 10/177,495

(22) Filed: Jun. 21, 2002

(65) Prior Publication Data

US 2003/0057898 A1 Mar. 27, 2003

Related U.S. Application Data

(60) Provisional application No. 60/316,236, filed on Aug. 31, 2001.

(51) Int. Cl.[7] .................................................. H01J 29/70
(52) U.S. Cl. ........................ 315/364; 315/370; 315/403
(58) Field of Search .......................... 315/370, 371, 315/393, 364, 399, 388, 403, 368.26, 368.28

(56) References Cited

U.S. PATENT DOCUMENTS

| 3,906,305 | A |   | 9/1975  | Nillesen ................ 315/399 |
|-----------|---|---|---------|----------------------------------|
| 4,254,365 | A |   | 3/1981  | Knight .................. 315/371 |
| 4,278,919 | A | * | 7/1981  | Hugo et al. ............. 315/393 |
| 4,469,992 | A |   | 9/1984  | Favreau et al. .......... 315/371 |
| 4,533,855 | A |   | 8/1985  | Willis et al. ........... 315/370 |
| 4,634,937 | A |   | 1/1987  | Haferl .................. 315/371 |
| 4,733,141 | A |   | 3/1988  | Watanuki ................ 315/371 |
| 4,779,030 | A |   | 10/1988 | Talks et al. ............ 315/408 |
| 4,780,648 | A |   | 10/1988 | Haferl .................. 315/371 |
| 4,823,052 | A |   | 4/1989  | Onozawa et al. .......... 315/408 |
| 4,827,194 | A |   | 5/1989  | Fernsler ................ 315/371 |
| 4,956,587 | A |   | 9/1990  | Kitou et al. ............ 315/408 |
| 5,034,664 | A | * | 7/1991  | Fernsler et al. ......... 315/370 |
| 6,060,845 | A |   | 5/2000  | Tsukahara et al. ........ 315/370 |
| 6,124,686 | A |   | 9/2000  | Kikuchi et al. .......... 315/408 |
| 6,218,791 | B1|   | 4/2001  | Teuling et al. .......... 315/408 |
| 6,222,328 | B1| * | 4/2001  | Kikuchi et al. .......... 315/399 |
| 6,222,329 | B1| * | 4/2001  | Kikuchi et al. .......... 315/399 |

* cited by examiner

*Primary Examiner*—Don Wong
*Assistant Examiner*—Jimmy T. Vu
(74) *Attorney, Agent, or Firm*—Joseph S. Tripoli; Harvey D. Fried; Sammy S. Henig

(57) ABSTRACT

A horizontal deflection circuit generates a horizontal deflection current in a deflection winding, during a trace interval and during a retrace interval of a deflection cycle. A transistor is responsive to a vertical rate parabola signal and to a negative feedback signal for producing a vertical rate parabolic modulation voltage at a collector of the transistor. A negative feedback network generates the feedback signal that is indicative of a current flowing in the transistor for increasing an output impedance at the collector of the transistor. An inductor is coupled to the collector of the transistor for producing in the inductor a modulation current to provide for side pincushion distortion correction in an East-West modulator.

13 Claims, 1 Drawing Sheet

DEFLECTION CURRENT MODULATION CIRCUIT

CROSS REFERENCE TO RELATED APPLICATIONS

This is a non-provisional application which claims the benefit of a provisional application serial No. 60/316,236, filed Aug. 31, 2001.

BACKGROUND OF THE INVENTION

This invention relates to raster distortion correction correction for a deflection circuit.

In a television receiver, the electron beams inside the television receiver picture tube are deflected by magnetic fields generated by sawtooth deflection currents flowing in horizontal and vertical deflection windings. The deflected electron beams scan a raster pattern on the picture tube phosphor screen. The raster pattern, without correction, may display various geometric distortions such as side or east-west pincushion distortion. The correction of inner raster distortion requires modulation of the S-shaping as a function of the distance along the vertical axis of the raster display, i.e. from top to the center and from the center to the bottom of the raster. This is achieved by modulation of the voltage across the S-capacitor. The modulated voltage appears also across the horizontal deflection winding and causes a modulation of the deflection current.

To correct side pincushion distortion, the peak-to-peak horizontal deflection trace current in the horizontal deflection winding is modulated at a vertical rate in a parabolic manner. Such parabolic modulation may be accomplished in a horizontal deflection circuit that includes an East-West modulator. Examples of East-West modulators that provide both side pincushion distortion correction and inner raster distortion correction are described in, for example, U.S. Pat. No. 3,906,305, entitled, CIRCUIT ARRANGEMENT FOR GENERATING A SAWTOOTH DEFLECTION CURRENT THROUGH A LINE DEFLECTION COIL, in the name of Nillesen (the Nillesen Patent).

An East-West modulator circuit, embodying an inventive feature, includes an amplifier for generating a voltage across a capacitor at a vertical rate in a parabolic manner. The capacitor voltage is coupled via an inductor to the deflection circuit for providing pincushion correction. The amplifier includes a transistor stage having a main current conducting path which varies the voltage across the capacitor.

The current through the inductor and the transistor of the modulator could include an undesirable decaying oscillating component or ringing following a fast transition in the input voltage to the amplifier, resulting in a width ringing at the top of the picture. It may be desirable to dampen the ringing in the deflection current by dampening the ringing in the capacitor.

In carrying out an inventive feature, a current feedback path is formed in the amplifier. Consequently, an output impedance of the amplifier at a junction terminal between the capacitor and the inductor sufficiently increases to dampen the ringing and reduce picture distortion.

SUMMARY OF THE INVENTION

A deflection apparatus embodying an inventive feature includes a deflection winding and a source of a synchronizing input signal at a frequency related to a first deflection frequency. A switching semiconductor is responsive to the first input signal and is coupled to the deflection winding for generating a deflection current in the deflection winding. A retrace capacitance is coupled to the deflection winding to form a retrace resonant circuit with the deflection winding during a retrace interval of a is deflection cycle. A source of a modulation input signal at a frequency related to a second deflection frequency is provided. A modulation amplifier is responsive to the modulation input signal for producing, from a current produced in an output stage of the modulation amplifier, a modulation voltage having a frequency related to the second deflection frequency to module the deflection current in a manner to provide side raster distortion correction. The modulation amplifier stage includes both a current feedback path that increases an output impedance of the output stage and a voltage feedback path that decreases the output impedance.

BRIEF DESCRIPTION OF THE DRAWINGS

The sole FIGURE illustrates a deflection circuit with pincushion correction, embodying an aspect of the invention.

DESCRIPTION OF THE PREFERRED EMBODIMENTS

Figure 1:
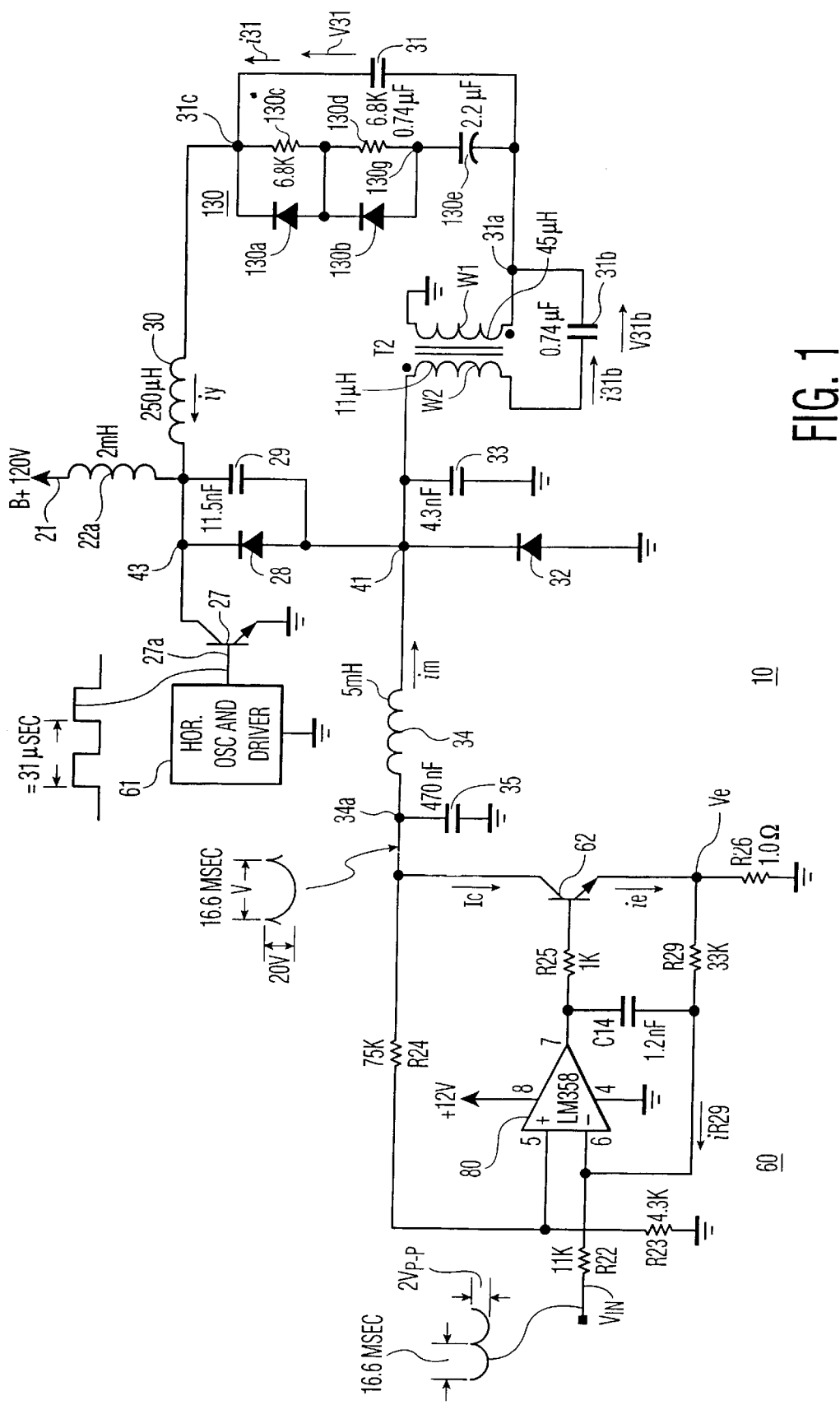

The sole FIGURE illustrates a horizontal deflection circuit 10, embodying an aspect of the invention. An operating voltage B+ is developed at a terminal 21 of a supply winding 22a. Winding 22a is coupled to a collector terminal 43 of a conventional horizontal output transistor 27. A base electrode of transistor 27 is coupled to receive from a conventional horizontal and driver stage 61a drive signal 27a at a horizontal rate of 31,468 Hz with a corresponding period H.

Coupled to terminal 43 is also a series arrangement of a horizontal deflection winding 30, a first trace or S-capacitor 31 and a winding W1 of an inner pin correction transformer T2. A ringing suppression network 130 is formed by a diode 130a and a diode 130b, coupled in series between a terminal 31c of capacitor 31 and a terminal 130g. Ringing suppression network 130 also includes a resistor 130c and a resistor 130d, coupled in parallel with diodes 130a and 130b, respectively. Ringing suppression network 130 further includes a capacitor 130e coupled between terminal 130g and terminal 31a of capacitor 31.

A second trace or S-capacitor 31b is coupled between a secondary winding W2 of transformer T2 and terminal 31a, at a junction of winding W1, capacitor 130e and capacitor 31. Thus, capacitor 31b is coupled in series with a secondary winding W2 of transformer T2. The pair of S-capacitors 31 and 31b and winding 30 are effectively coupled in series.

A damper diode 32 is coupled in parallel with a retrace capacitor 33 and between a terminal 41 of winding W2 that is remote from capacitor 31b and a reference or ground potential. A horizontal damper diode 28 is coupled in parallel with a horizontal retrace capacitor 29 and between terminals 41 and collector terminal 43 of transistor 27. The switching operation of transistor 27 produces a deflection current iy in winding 30 having a trace portion and a resonant, retrace portion, in a well known manner.

A conventional East-West integration inductor or choke 34 is coupled between terminal 41 and a terminal 34a of a conventional filter capacitor 35. Choke 34 has an impedance that is substantially higher, for example, five times higher, than that of deflection winding 30 at a resonant retrace frequency of current iy.

Terminal 34a also forms an output terminal of an East-West modulation amplifier 60. Modulation amplifier 60 produces at output terminal 34a a vertical rate parabola voltage V34. Voltage V34 produces a vertical rate East-West modulation current im in choke 34.

Retrace capacitor 29, deflection winding 30, retrace capacitor 33 and the effective inductance associated with windings W1 and W2 of transformer T2 form a bridge configuration similar to that of an East-West modulator described in the Nillesen Patent. Current im provides both a side or East-West pincushion raster distortion correction and an inner raster distortion correction in a similar way to that described in the Nillesen Patent. Deflection current iy flows in S-capacitors 31 and 31b. The amplitude of current iy varies in accordance with the vertical rate modulation produced by current im. The result is that a smaller amount of S correction is provided at the top and bottom and a larger amount of S correction is provided at the vertical center of the display screen, not shown. A current i31 is produced by current iy in S-capacitor 31. The modulation of a voltage V31 in S-capacitor 31 changes as the amplitude of current iy changes for providing inner pin errors correction.

A turns ratio, 2:1, associated with transformer T2, between the winding turns of winding W1 and those of winding W2, is chosen to ensure that damper diode 32 continues to conduct, throughout the first half of horizontal scan, under all load conditions. The turn ratio associated with transformer T2 establishes the ratio of inner-pin correction to side-pin correction.

Non-inverting modulation amplifier 60, embodying an inventive feature, includes an operational amplifier 80. An output terminal, pin 7, of amplifier 80 is coupled via a protection resistor R25 to the base of a driver transistor 62. An emitter of transistor 62 is coupled to ground via a current feedback sense resistor R26. A collector terminal 34a of transistor 62 forming an output stage of amplifier 60 is coupled via a voltage feedback resistor R24 to a non-inverting input terminal, pin 5, of amplifier 80. Resistor R24 is coupled to a resistor R23 via non-inverting input terminal, pin 5, of amplifier 80 to form a voltage divider for establishing the closed loop voltage gain of amplifier 60, in accordance with the ratio between the values of resistors R24 and R23. A vertical rate parabola signal Vin is coupled to an inverting input terminal, pin 6, of amplifier 80.

As a result of a voltage feedback path provided by voltage feedback resistor R24, an output impedance at collector teminal 34a of transistor 62 is lower than an input impedance at terminal 34a of the reactive network formed by capacitor 35 and choke 34 at the frequency of voltage Vin. Without voltage feedback resistor R24, the output impedance at terminal 34a would be determined by the high collector output impedance of transistor 62.

In carrying out an inventive feature, a current feedback resistor R29 is coupled between inverting input terminal, pin 6, of amplifier 80 and the emitter of transistor 62 to provide a current feedback current iR29, in accordance with an emitter voltage Ve of transistor 62. Emitter voltage Ve of transistor 62 is equal to a product of an emitter current ie in transistor 62 and the value of current sense resistor R26.

Assume, for explanation purpose that feedback resistor R29 were absent from amplifier 60. As a result, a voltage gain, A, with respect to pin 6 of amplifier 80 would have been equal to 1+R24/R23, where the symbols R24 and R23 represent the values of the corresponding resistors. Because of the negative voltage feedback, an output impedance or resistance, Ro, at collector terminal 34a of transistor 62 would have been too small to provide any significant ringing dampening. Therefore, the current flowing in choke 34 and in transistor 62 emitter could include a decaying oscillating or ringing component following a fast transition in input voltage Vin, resulting in a width ring at the top of the picture, not shown.

In carrying out an inventive feature, the inclusion of current feedback resistor R29 in amplifier 60, advantageously, increases the output impedance or resistance, Ro, at terminal 34a to, for example, 5 ohms, as follows: Ro=R26*R22/(R22+R29))*(1+R24/R23). The symbols R24, R23, R29, R22 and R26 represent the values of the corresponding resistors. The voltage gain, A,=(R29/(R29+R22))*(1+R24/R23). Thus, advantageously, the output impedance at terminal 34a at the low frequency of voltage Vin increases to an extent sufficient for quickly attenuating the ringing to avoid picture distortion. In this way, transistor 62 acts as an active resistor.

Assume, hypothetically, that instead of using of current feedback in transistor 62 via resistor R29, a discrete, passive collector resistor having a value equal to Ro were coupled between capacitor 35 and terminal 34a, in a matter not shown. Such passive collector resistor, not shown, would also produce output impedance or resistance, Ro, at collector terminal 34a of transistor 62. However, such passive collector resistor, disadvantageously, would have had to have a relatively large power dissipation capability.

Advantageously, the use of the current feedback in transistor 62 via resistor R29 eliminates the need for using the aforementioned passive collector resistor, not shown. Instead, power is dissipated in transistor 62. Sufficient power dissipation capability is anyhow required from transistor 62 for performing its task as a modulation driver transistor, even in the absence of the need to suppress ringing. Thus, advantageously, the ringing suppression function of transistor 62 does not add any burden on the requirements from transistor 62.

In addition to the thermal advantage of the use of transistor 62 as an active resistor over using passive collector resistor, not shown, transistor 62 acting as an active resistor has a greater dynamic range. In the aforementioned passive collector resistor approach, the minimum value of the output voltage at terminal 34a cannot be lower than the value, Ic1*(Ro+R26)+Vce_sat. The symbol Ic1 denotes the value of collector current Ic at the vertical center of trace and the symbol Vce_sat denotes the saturation voltage of transistor 62. Advantageously, by using current feedback in amplifier 60 via resistor R29, the minimum value of the output voltage at terminal 34a need not exceed the value, Ic1*R26+Vce_sat. Consequently, the dynamic voltage range of the modulation voltage at terminal 34a is increased by the amount Ic*Ro relative to that obtained by employing the passive collector resistor approach.

What is claimed is:

1. A deflection apparatus, comprising:
   a deflection winding;
   a source of a synchronizing input signal at a frequency related to a first deflection frequency;
   a switching semiconductor responsive to said first input signal and coupled to said deflection winding for generating a deflection current in said deflection winding;
   a retrace capacitance coupled to said deflection winding to form a retrace resonant circuit with said deflection winding during a retrace interval of a deflection cycle;
   a source of a modulation input signal at a frequency related to a second deflection frequency; and
   a modulation amplifier responsive to said modulation input signal for producing, from a current produced in an output stage of said modulation amplifier, a modulation voltage having a frequency related to said second deflection frequency to modulate said deflection current in a manner to provide side raster distortion correction, said modulation amplifier stage including both a current feedback path that increases an output impedance of said output stage and a voltage feedback path that decreases said output impedance.

2. The deflection apparatus according to claim 1 wherein said deflection current is at said first frequency and said second frequency is at a vertical deflection frequency.

3. The deflection apparatus according to claim 1, further comprising a reactive network coupled to said modulation amplifier output and responsive to said modulation voltage for producing a modulation current at a frequency related to said second deflection frequency that is coupled to said deflection winding.

4. The deflection apparatus according to claim 1 wherein said reactive network includes an inductance and a filter capacitor forming an input impedance having a substantially higher value, at said second deflection frequency, than said output impedance of said amplifier.

5. The deflection apparatus according to claim 4, wherein said filter capacitor is coupled at a junction terminal between said inductance and a main current conducting terminal of a transistor of said modulation amplifier.

6. The deflection apparatus according to claim 1, wherein said increased output impedance reduces a ringing voltage in said filter capacitor.

7. The deflection apparatus according to claim 1, wherein said switching semiconductor comprises a transistor.

8. The deflection apparatus according to claim 1, wherein said switching semiconductor comprises a transistor, a first diode and a second diode.

9. A deflection apparatus with raster distortion correction, comprising:

a deflection winding;

a source of a synchronizing input signal at a frequency related to a first deflection frequency;

a first transistor responsive to said first input signal and coupled to said deflection winding for generating a deflection current in said deflection winding; a retrace capacitance coupled to said deflection winding to form a retrace resonant circuit with said deflection winding during a retrace interval of a deflection cycle;

a source of a modulation input signal at a frequency related to a second deflection frequency;

a second transistor responsive to said modulation input signal for producing a modulation voltage at a main current conducting terminal of said second transistor at a frequency related to said second deflection frequency, said modulation voltage being coupled to said deflection winding to modulate said deflection current for providing raster distortion correction; and a current sensor for generating a current feedback signal indicative of said current flowing in said second transistor, said current feedback signal being coupled to a control terminal of said second transistor for varying an output impedance at said main current conducting terminal.

10. The deflection apparatus according to claim 9 wherein said deflection current is at said first frequency and said second frequency is at a vertical deflection frequency.

11. The deflection apparatus according to claim 9, further comprising a reactive network coupled to said main current conducting terminal for producing a modulation current that is coupled to said deflection winding.

12. The deflection apparatus according to claim 9 wherein said reactive network includes an inductance and a filter capacitor forming an input impedance having a substantially higher value, at said second deflection frequency, than said output impedance.

13. A deflection apparatus, comprising:

a deflection winding;

a source of a synchronizing input signal at a frequency related to a first deflection frequency;

a switching, first transistor responsive to said first input signal and coupled to said deflection winding for generating a deflection current in said deflection winding;

a retrace capacitance coupled to said deflection winding to form a retrace resonant circuit with said deflection winding during a retrace interval of a deflection cycle;

a source of a modulation input signal at a frequency related to a second deflection frequency;

a modulation amplifier responsive to said modulation input signal and having an output transistor for producing, from a current produced in a main current conducting terminal of said output transistor, a modulation voltage having a frequency related to said second deflection frequency;

a reactive network coupled to said main current conducting terminal of said output transistor for applying said modulation voltage to said deflection winding to modulate said deflection current in a manner to provide at least one of a side raster distortion correction and an inner raster distortion correction, said reactive network forming an input impedance that is higher at a retrace frequency of said deflection current than an output impedance of said modulation amplifier developed at said main current conducting terminal of said output transistor; and a current feedback network responsive to a signal indicative of a current in said output transistor and coupled to said output transistor for increasing said output impedance of said modulation amplifier.

* * * * *